(12) United States Patent
Wood

(10) Patent No.: US 6,774,700 B1
(45) Date of Patent: Aug. 10, 2004

(54) CURRENT-MODE LOGIC DIFFERENTIAL SIGNAL GENERATION CIRCUIT EMPLOYING SQUELCH

(75) Inventor: Glenn Wood, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/651,675

(22) Filed: Aug. 29, 2003

(51) Int. Cl.[7] .............................................. H03K 17/62
(52) U.S. Cl. ...................... 327/403; 327/108; 455/218
(58) Field of Search ................................ 327/108, 331, 327/403, 560–563; 326/56–58, 80–91, 115, 127; 455/218, 220

(56) References Cited

U.S. PATENT DOCUMENTS

| | | | | |
|---|---|---|---|---|
| 5,796,301 A | * | 8/1998 | Tanabe et al. ................. 330/9 |
| 6,026,051 A | * | 2/2000 | Keeth et al. ................. 365/233 |
| 6,353,338 B1 | * | 3/2002 | Fiedler et al. ................. 326/83 |
| 2003/0081743 A1 | * | 5/2003 | Chiang et al. ........... 379/93.08 |
| 2003/0148801 A1 | * | 8/2003 | Deyring et al. ............. 455/701 |

* cited by examiner

Primary Examiner—Minh Nguyen
(74) Attorney, Agent, or Firm—Kyle J. Way

(57) ABSTRACT

An electrical circuit generates both a differential data signal and a "squelch," or "out-of-band," state over a differential signal pair by employing common-mode logic (CML) technology. In one embodiment of the invention, a CML buffer having true and complementary (inverted) data outputs drive the differential data signal onto the positive ('p') and negative ('n') signal lines of the differential pair. To implement the squelch state, the true and complementary outputs of a two-input CML multiplexer are coupled with the corresponding outputs of the buffer. The data inputs of the multiplexer are driven by the data input signal driving the buffer, as well as the logical inversion of the data input signal. A squelch state signal then drives an input selector of the multiplexer to impress the squelch state over the differential signal pair when active.

14 Claims, 5 Drawing Sheets

CURRENT-MODE LOGIC DIFFERENTIAL SIGNAL GENERATION CIRCUIT EMPLOYING SQUELCH

BACKGROUND OF THE INVENTION

Several modern high-speed serial data busses, normally used for digital communication between physically separated electronic devices, implement the well-known, time-tested "differential pair" signal line configuration to transmit and receive data. The differential pair typically consists of two signal lines, a positive ("p") signal line and a negative ("n") signal line, which normally exhibit one of two possible voltage values during normal data transmission. During such data transmission, the two signal lines exhibit different voltage values from each other. For example, a data value of '1' is usually indicated on a differential pair with a voltage V+ on the "p" line, and a lower voltage V− on the "n" line. Similarly, to indicate a data value of '0', the "p" line holds a voltage of V− while the "n" line exhibits a voltage of V+. Therefore, except during times in which the data value of the differential pair is in transition, the magnitude of the differential voltage between the two signal wires generally remains at about V+ minus V−. Advantageously, differential pair signal lines have long been known to demonstrate high common-mode rejection, which allows the data being transferred to be unaffected by noise that is induced onto both signal wires of the differential pair.

In addition to transferring data, the modern serial data busses that utilize differential pairs for data transfer, such as Serial AT Attachment (Serial ATA), also utilize those same signal wires to indicate changes in the overall state of the communication link, such as to invoke data bus power management. To indicate these state changes, the two signal wires of the differential pair normally are driven so that the resulting differential voltage is substantially zero for specific periods of time. Driving the differential signal pair in this manner is commonly known as "squelch," or "out-of-band" signaling. As a result, electronic devices connected to such a bus are usually required to generate the squelch state of the differential pair, which generally lasts only for a few tens or hundreds of nanoseconds.

Due to the high-speed nature of modern serial data busses employing a differential signal pair, one attractive logic technology for implementing a transmission circuit for such an interface is current-mode logic (CML). Discrete CML components have become more readily available and popular due to their improved power-delay product and back-termination capability in comparison to their more widely recognized emitter-coupled logic (ECL) counterparts. Additionally, CML components are easily adapted to support a variety of voltage swing levels normally used for differential pair signal lines.

Given the potential benefits associated with the use of CML in this environment, a need presently exists for a reliable CML differential signal generation circuit that also produces a squelch state. Such a circuit would take advantage of the high-speed, low-power, variable voltage characteristics of CML while also generating a squelch state over the same differential pair in a reliable fashion.

SUMMARY OF THE INVENTION

Embodiments of the invention, to be discussed in detail below, provide an electrical circuit for generating a differential data signal and a squelch state over a differential signal pair having a positive ('p') and a negative ('n') signal line. A current-mode logic (CML) buffer having both true and complementary data outputs drives the 'p' and 'n' lines of the differential signal pair, transferring the data embodied in the data signal driving the input of the buffer. In addition, a CML multiplexer also has true and complementary data outputs which are coupled to the corresponding outputs of the buffer. The data inputs of the multiplexer are driven by the data signal and the logical inversion of the data signal. Additionally, a squelch state signal drives the selector input of the multiplexer so that the squelch state appears on the differential signal pair when the squelch state signal is active.

Use of embodiments of the invention result in a simple circuit that enjoys the various benefits of CML technology as applied to high-speed data transmission while also providing a straightforward means of forcing a squelch state over the differential signal pair.

Other aspects and advantages of the invention will become apparent from the following detailed description, taken in conjunction with the accompanying drawings, illustrating by way of example the principles of the invention.

DETAILED DESCRIPTION OF THE PREFERRED EMBODIMENTS

Before describing specific embodiments of the invention, a short discussion of the actions of the differential signal lines, "p" and "n", during both the data transfer state and squelch, or out-of-band, state is desirable. As stated earlier, the squelch state essentially is the state in which the "p" and "n" signal lines are not being driven to their normal data transmission voltage levels.

Figure 1:
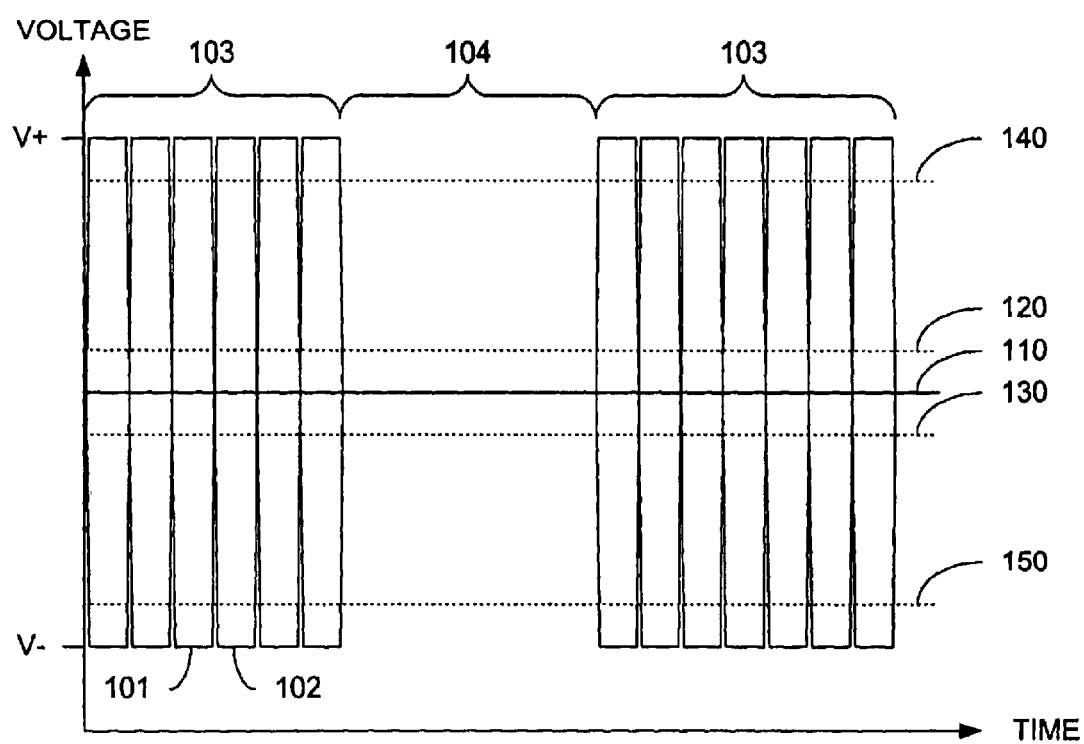
FIG. 1 is a waveform diagram describing the operation of a differential signal pair when transferring data and when in a squelch state.

FIG. 1 displays in an idealized fashion the action of the differential signal lines when in a data transfer state 103 and while in a squelch state 104. In typical differential signal fashion, the "p" signal waveform 101 and the "n" signal waveform 102, during the data transfer state 103, are essentially mirror images of each other across a midpoint voltage 110, existing substantially halfway between voltage levels V+ and V−. In other words, while the voltage of the "p" signal waveform 101 is at V+, the voltage of the "n" signal waveform 102 is at V−, and vice-versa. To ensure that the data represented by the "n" and "p" signal lines is interpreted properly, the signal waveforms 101 and 102 must reside above a minimum high data voltage 140 or below a maximum low data voltage 150 for data to be transmitted reliably. In meeting this requirement, data is transmitted reliably across the differential signal lines when the difference between the differential pair exceeds the difference between the minimum high data voltage 140 and the maximum low data voltage 150. These data thresholds are normally specified to allow for variations in signal driver and receiver designs, noise from other signal sources, and other factors to ensure interoperability across devices transmitting and receiving data via the differential pair.

During the squelch state 104, the "p" and "n" signals generally maintain their voltage within a second pair of voltage limits so that the squelch state 104 can be distinguished from the data transfer state 103. More specifically, the differential signals should maintain their voltage levels between the maximum squelch voltage 120 and the minimum squelch voltage 130 to ensure that the squelch state 104 will be detected. In doing so, the difference between the voltages of the differential signal pair is less than the difference between the maximum squelch voltage 120 and the minimum squelch voltage 130, thus indicating the squelch state 104.

Figure 2:
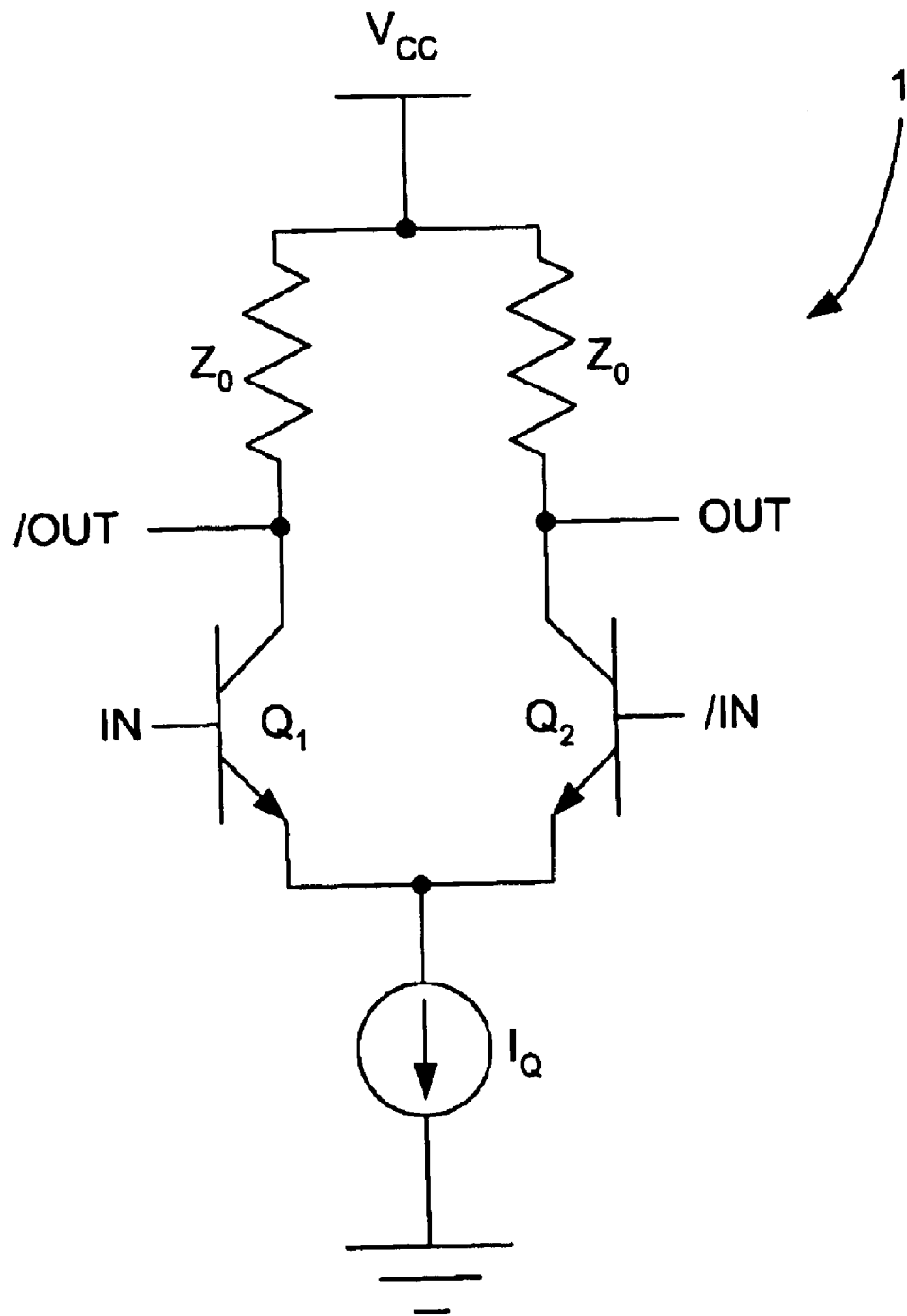
FIG. 2 is a schematic diagram of a typical current-mode logic (CML) buffer circuit from the prior art.

To generate both the data transfer state 103 and the squelch state 104, embodiments of the present invention employ current-mode logic (CML). An example of a typical CML buffer circuit 1 from the prior art is shown in FIG. 2. A pair of n-p-n transistors $Q_1$ and $Q_2$ in common emitter configuration are each aligned in series with an impedance $Z_0$ between a supply voltage $V_{CC}$ and a common current source $I_Q$. The impedance $Z_0$ serves both as a means of developing a voltage drop below $V_{CC}$ as well as a means of providing back-termination to enhance signal integrity by reducing signal reflections in the buffer outputs, which are described below. The bases of the transistors $Q_1$ and $Q_2$ are driven by true (IN) and complementary (/IN) versions of an input signal IN. The transistors $Q_1$ and $Q_2$ respond to the logic level of IN and /IN to drive two outputs, a true output signal OUT and a complementary output signal /OUT. When the data signal IN is at an active HIGH voltage level (approximately $V_{CC}$), the transistor $Q_1$ turns ON, causing /OUT to attain a voltage of $V_{CC}-I_QZ_0$. This voltage is substantially lower than the $V_{CC}$ exhibited at the output OUT that occurs simultaneously as a result of /IN being at a LOW voltage level (approximately 0 volts), which forces $Q_2$ OFF. Conversely, when the voltage of IN becomes LOW while /IN goes HIGH, $Q_1$ shuts OFF while $Q_2$ turns ON, causing /OUT to rise substantially to $V_{CC}$ while OUT falls to $V_{CC}-I_QZ_0$. In other words, the data outputs OUT and /OUT follow the state of the inputs IN and /IN while being suitable for driving data over a differential signal pair.

Figure 3:
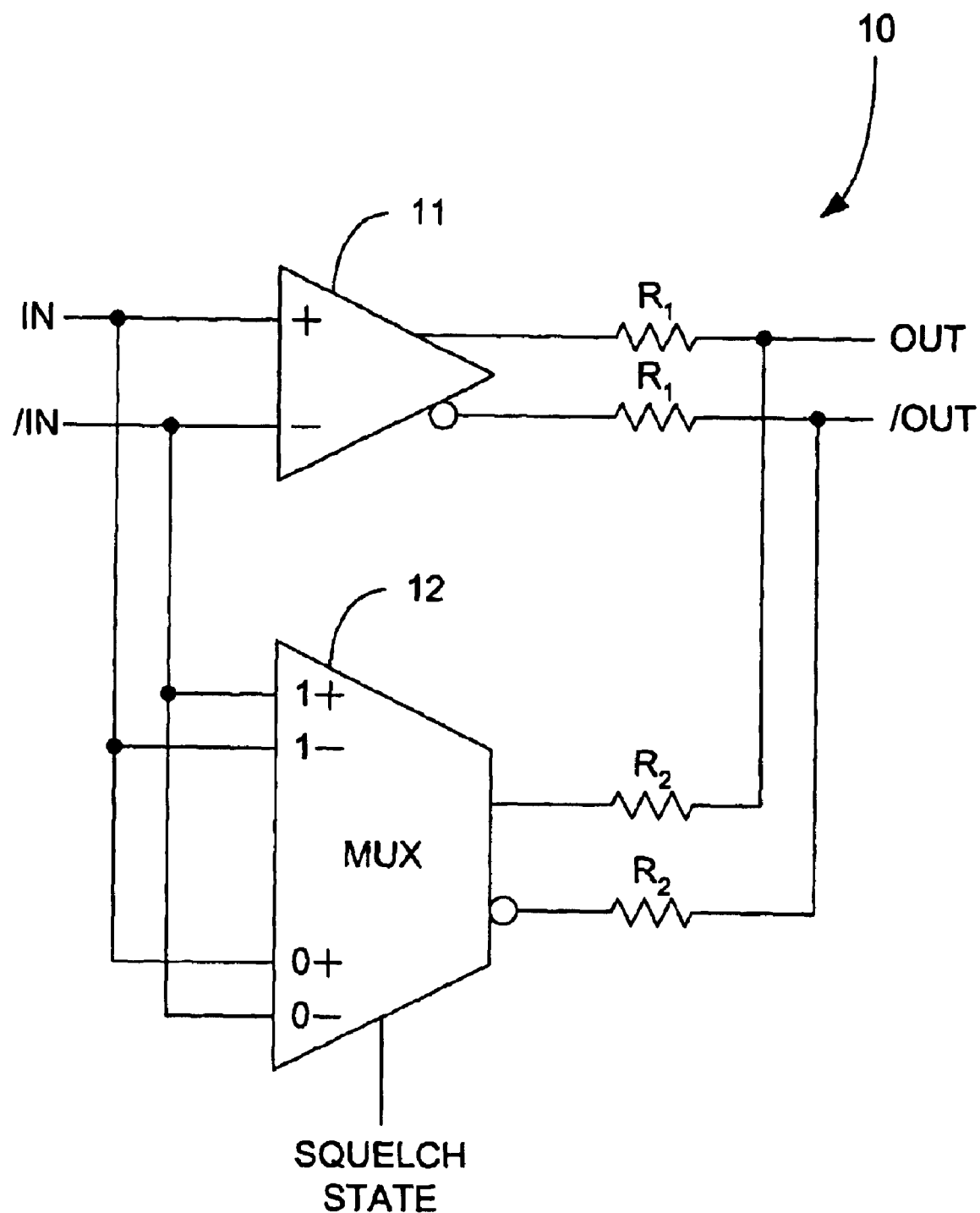
FIG. 3 is a schematic diagram of an electrical circuit for both generating a differential data signal and a squelch state according to an embodiment of the invention.

This typical CML buffer circuit 1 may then be used as the basis of an electrical circuit 10, as shown in FIG. 3, designed to both generate differential data signals and a squelch state of a differential signal pair. Ignoring the various resistors depicted for the moment, a CML buffer 1, several versions of which currently may be obtained from various integrated circuit (IC) manufacturers, operates substantially as the typical CML buffer circuit 1 displayed in FIG. 2. The CML buffer 11 is employed in this embodiment of the invention to provide true and complementary data outputs that drive the 'p' and 'n' signal lines (denoted as OUT and /OUT, respectively) of a differential signal pair based on the value of a true and a complementary data input. These data inputs are driven, respectively, by a data input signal and the logical inversion of that signal, indicated by IN and /IN. In this embodiment, IN and /IN may be CML-compatible signals, transistor-transistor logic (TTL) signals, or any other logic signal capable of meeting the input specifications of the particular CML buffer 11 employed.

To implement the squelch state for the differential signal pair, a CML multiplexer 12, also obtainable from a variety of IC vendors, is utilized. In a fashion similar to that of the CML buffer 11, the multiplexer 12 provides a true and a complementary data output, which in this case are coupled with the corresponding outputs of the CML buffer 11. The multiplexer 12 also takes as input the same true and complementary data input signals IN and /IN associated with the CML buffer 11. IN and /IN drive the corresponding inputs of the data '0' input of the multiplexer 11, while they are cross-connected with respect to the data '1' input (i.e., IN drives the complementary input for bit '1', while /IN drives the true '1' input).

Which data input, '0' or '1', is gated to the multiplexer data outputs is determined by the input selector of the multiplexer 12, driven by a squelch state signal. When the squelch state signal is LOW, the data '0' inputs are driven onto the multiplexer 12 outputs. In that case, both the buffer 11 and the multiplexer 12 drive the OUT signal line to the same voltage level, as determined by the input signal lines IN and /IN. Likewise, the buffer 11 and the multiplexer 12 drive the complementary data output /OUT to the same voltage. Thus, when IN is HIGH and /IN is LOW, OUT is driven HIGH while /OUT is LOW. When IN and /IN then swap voltage levels, OUT and /OUT do the same. As a result, differential signal data is generated on the differential signal pair in a typical fashion when the squelch state signal is not active.

However, when the squelch state signal becomes active, the multiplexer 12 serves to counteract any data driven onto the differential signal pair by the buffer 11. This particular mode of operation is shown by way of the simplified schematic of FIG. 4, which shows a resulting output circuit 20 formed by the output stage 21 of the buffer 11 and the output stage 22 of the multiplexer 12.

Ignoring the resistors $R_1$ and $R_2$ for now, and assuming the data input IN has a HIGH voltage, transistors $Q_1$ and $Q_4$ are turned ON, while /IN shuts off transistors $Q_2$ and $Q_3$. With $Q_2$ OFF and $Q_4$ ON, the output stage 21 of the buffer 11 attempts to drive the true data output OUT to $V_{CC}$, while the output stage 22 of the multiplexer 12 attempts to drop OUT to a lower voltage level. The two output stages 21 and 22 combine to drive OUT to a voltage of $V_{CC}-(I_QZ_0/2)$, or about halfway between $V_{CC}$ (a normal HIGH output voltage level) and $V_{CC}-I_QZ_0$ (a normal LOW output voltage level). This voltage level occurs as a result of the current source $I_Q$ driving current though a parallel combination of the two resistors $Z_0$ associated with the transistors $Q_2$ and $Q_4$. This voltage, being the midpoint voltage 110 between the normal HIGH and LOW voltages for the differential signal, represents a compatible voltage between a maximum squelch voltage 120 and a minimum squelch voltage 130 required to ensure that the squelch state 104 will be detected, as shown in FIG. 1.

The complementary output signal /OUT reacts similarly under the same circumstances. While IN is HIGH, transistor $Q_1$ is ON and transistor $Q_3$ is OFF. As a result, the voltage of /OUT in that case is $V_{CC}-(I_QZ_0/2)$, the same as that residing on the true output signal OUT, thus placing the differential signal pair in the squelch state.

If, instead, the data input signal IN has a LOW voltage, and /IN exhibits a HIGH voltage, transistors $Q_1$ and $Q_4$ are now OFF, and transistors $Q_2$ and $Q_3$ turn ON. However, the result is the same: both OUT and /OUT remain at a voltage of about $V_{CC}-(I_QZ_02)$ within the voltage range between the maximum squelch voltage 120 and the minimum squelch voltage 130 that designates the squelch state 104.

Figure 4:
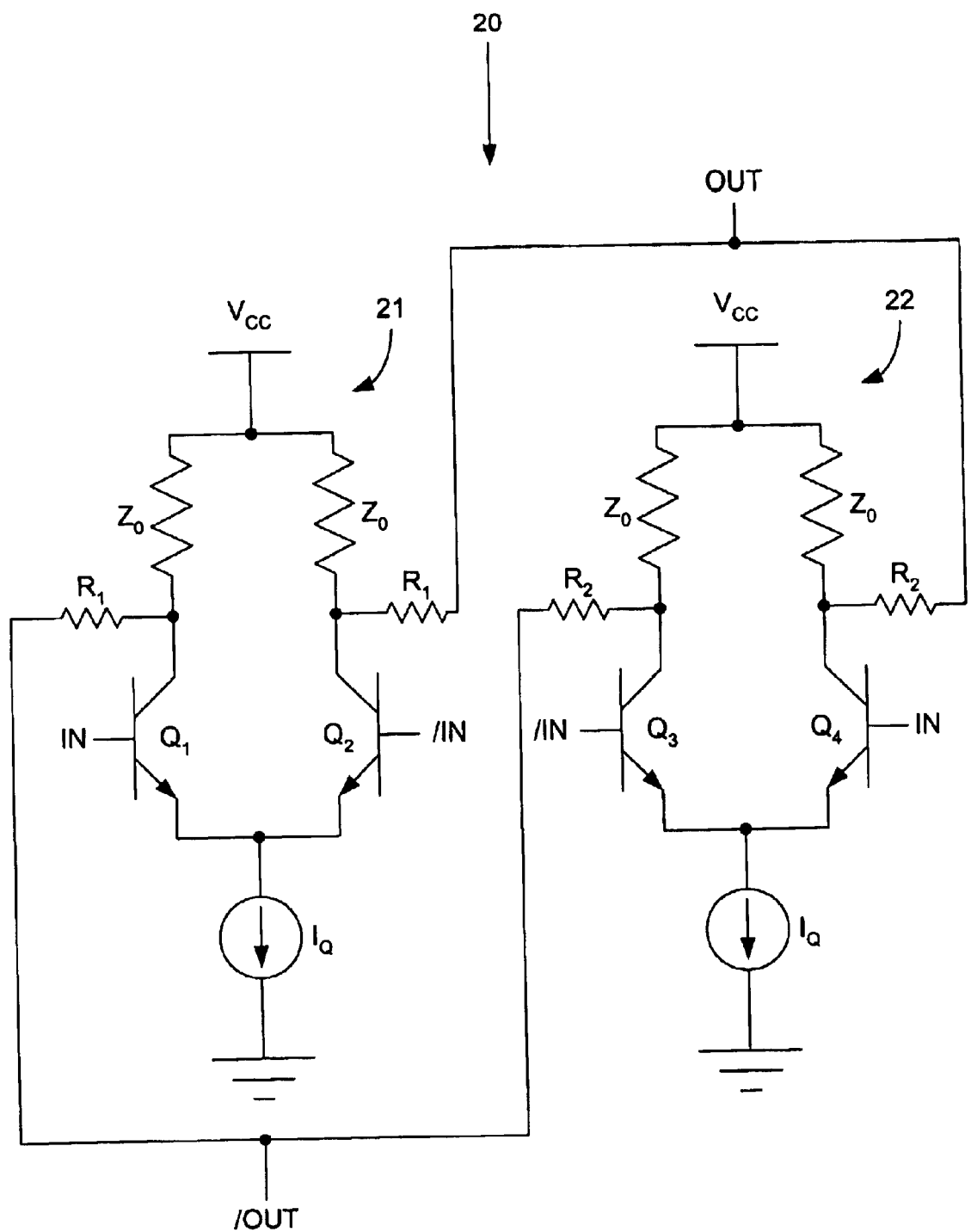
FIG. 4 is a schematic diagram of how a CML buffer and CML multiplexer of the electrical circuit of FIG. 3 interact when the squelch state signal of the disclosed embodiments is in its active state.

This analysis applies in the case that the strength of the two current sources $I_Q$ shown in FIG. 4 are matched closely so that the voltage across the true and complementary outputs OUT and /OUT rests near $V_{CC}-(I_Q Z_0/2)$ when the squelch state signal is active. If the current sources $I_Q$ are not sufficiently matched, resistors $R_1$ and $R_2$, shown in FIG. 3 and FIG. 4, may be employed at the outputs of the buffer 11 and the multiplexer 12 to modify the voltage levels of the true and complementary outputs. In doing so, the voltage difference between OUT and /OUT may be minimized to ensure a proper squelch state. For example, if the current source $I_Q$ of the CML buffer 11 is stronger than that associated with the CML multiplexer 12, a small differential signal will result even when the squelch state signal is active. To counteract this effect, small resistors $R_1$ may be added to ensure that the voltage difference between OUT and /OUT remains within the requirements for the squelch state 104. Similarly, if the current source $I_Q$ of the multiplexer is the stronger of the two, small resistors $R_2$ may be employed to balance the voltages of OUT and /OUT. The resistors $R_1$ and $R_2$ may be employed as either on-chip resistors, external fixed resistors, or as small potentiometers, depending on the requirements of the particular application.

A possible enhancement to the embodiments described above is to double the value of the impedances $Z_0$ within the buffer 11 and the multiplexer 12 compared to their typical values. Generally, the impedances $Z_0$ associated with a CML output circuit match the characteristic impedance of the signal line being driven. For example, to drive a 50-ohm signal line, a 50-ohm impedance $Z_0$ would typically be used to match the signal line impedance, thus reducing unwanted signal reflections at the output. However, when two outputs, such as those of the buffer 11 and the multiplexer 12, are coupled together as shown in FIG. 3 and FIG. 4, the back-impedance of that combination is reduced by half due to the parallel combination of the impedances $Z_0$ of the two outputs involved. Thus, by doubling each of the impedances $Z_0$, the resulting impedance would be restored to its original $Z_0$ value, thus providing effective back-termination. While such a modification is normally not available when standard CML integrated circuits are employed, doubling the impedance $Z_0$ is more easily accomplished if the buffer 11 and the multiplexer 12 are implemented within a custom IC.

Figure 5:
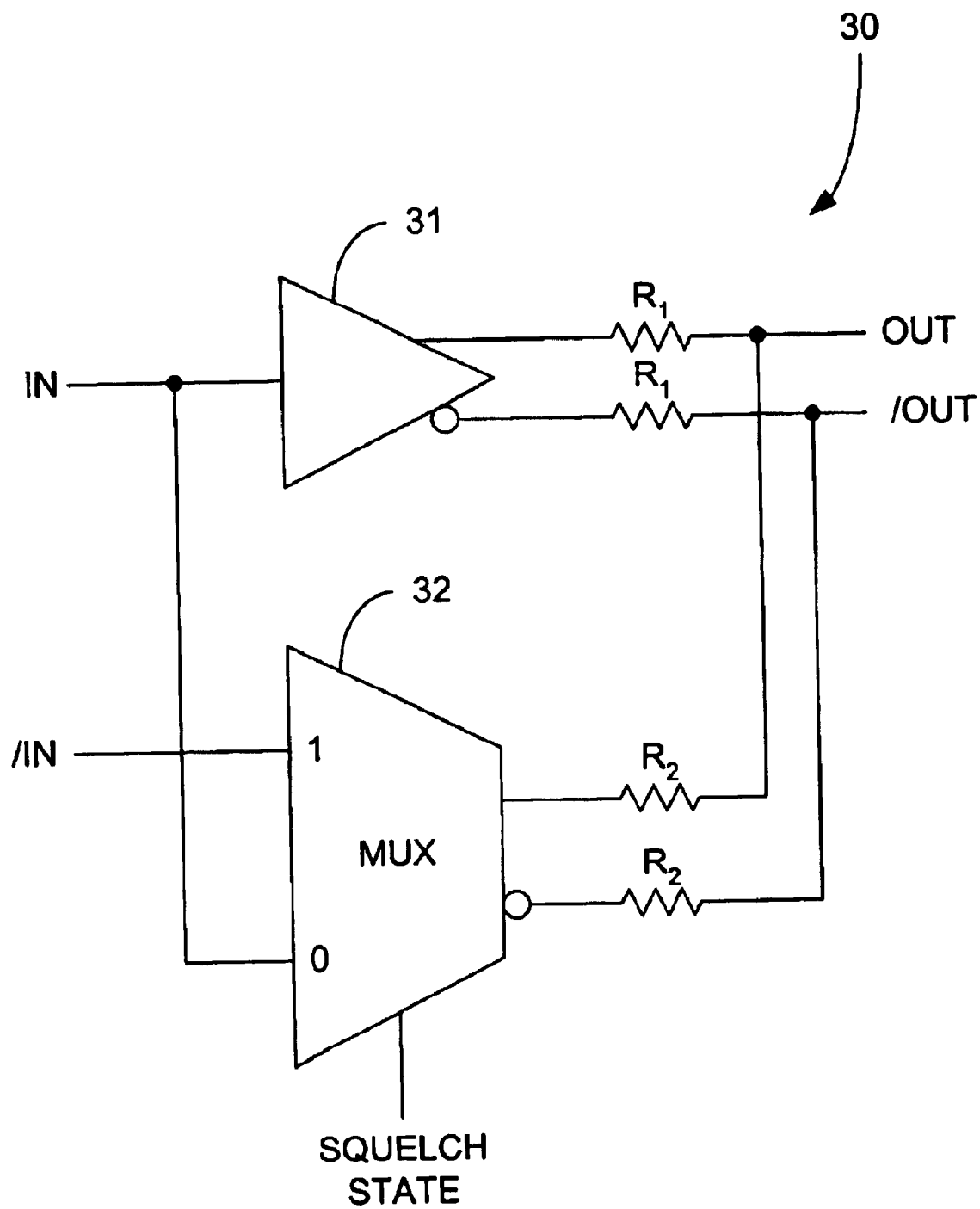
FIG. 5 is a schematic diagram of a second electrical circuit for generating a differential data signal and a squelch state according to an embodiment of the invention.

Another possible embodiment of the invention, a second electrical circuit 30 for generating both differential data and a squelch state, is shown in FIG. 5. In this case, a CML buffer 31 and a CML multiplexer 32 employing single-ended inputs are used. Such inputs may be compatible with a variety of logic technologies, including TTL, making the circuit 30 more easily driven by common digital circuits. Descriptions provided above of the electrical circuit 10 shown in FIG. 1, referring to the output circuit 20 denoted in FIG. 2, including the potential use of resistors $R_1$ and $R_2$, apply equally to the second electrical circuit 30 of FIG. 5.

From the foregoing, embodiments of the invention provide a quick and reliable electrical circuit for generating a differential signal and a squelch or out-of-band state onto a differential signal pair. Specific embodiments of the invention other than those shown above are also possible. As a result, the invention is not to be restricted to the specific forms so described and illustrated; the invention is limited only by the claims.

What is claimed is:

1. An electrical circuit for generating a differential data signal and a squelch state over a differential signal pair, the differential signal pair having a positive signal line and a negative signal line, the circuit comprising:
   a current-mode logic (CML) buffer having a true data input, a true data output and a complementary data output, the true data output driving the positive signal line, the complementary data output driving the negative signal line, the data input being driven by a data input signal; and
   a CML multiplexer having a first and second true data inputs, an input selector, a true data output and a complementary data output, the first true data input being driven by the data input signal, the second true data input being driven by a logical inversion of the data input signal, the input selector being driven by a squelch state signal, the true data output being coupled with the true data output of the CML buffer, and the complementary data output being coupled with the complementary data output of the CML buffer.

2. The electrical circuit of claim 1, wherein the CML buffer also has a complementary data input driven by the logical inversion of the data input signal.

3. The electrical circuit of claim 1, wherein the CML multiplexer also has a first and a second complementary data input, the first complementary data input being driven by the logical inversion of the data input signal, the second complementary data input being driven by the data input signal.

4. The electrical circuit of claim 1, wherein the CML buffer and the CML multiplexer are discrete electronic components.

5. The electrical circuit of claim 1, wherein the CML buffer and the CML multiplexer are logic circuits implemented within a single integrated circuit.

6. The electrical circuit of claim 1, wherein the CML buffer and the CML multiplexer each have back-termination impedances approximately twice the value of the characteristic impedance of the positive signal line and the negative signal line.

7. The electrical circuit of claim 1, further comprising:
   a first series resistor connected to the true data output of the CML buffer; and
   a second series resistor connected to the complementary data output of the CML buffer, the second series resistor being of substantially equal value to that of the first series resistor, the values of the first and second series resistors being such that the difference between the voltages of the positive signal line and the negative signal line remain within a predetermined limit when the squelch state signal is active.

8. The electrical circuit of claim 7, wherein the first and second series resistors are on-chip resistors.

9. The electrical circuit of claim 7, wherein the first and second series resistors are external fixed resistors.

10. The electrical circuit of claim 7, wherein the first and second series resistors are potentiometers.

11. The electrical circuit of claim 1, further comprising:
   a first series resistor connected to the true data output of the CML multiplexer; and
   a second series resistor connected to the complementary data output of the CML multiplexer, the second series resistor being of substantially equal value to that of the first series resistor, the values of the first and second series resistors being such that the difference between the voltages of the positive signal line and the negative signal line remain within a predetermined limit when the squelch state signal is active.

12. The electrical circuit of claim 11, wherein the first and second series resistors are on-chip resistors.

13. The electrical circuit of claim 11, wherein the first and second series resistors are external fixed resistors.

14. The electrical circuit of claim 11, wherein the first and second series resistors are potentiometers.

* * * * *